United States Patent [19]

Kunze et al.

[11] Patent Number: 5,285,336
[45] Date of Patent: Feb. 8, 1994

[54] MAGNETIC-TAPE-CASSETTE APPARATUS

[75] Inventors: Norbert Kunze, Ehringshausen; Georg Weber, Lohra, both of Fed. Rep. of Germany

[73] Assignee: U.S. Philips Corporation, New York, N.Y.

[21] Appl. No.: 724,557

[22] Filed: Jun. 28, 1991

[30] Foreign Application Priority Data

Jul. 13, 1990 [DE] Fed. Rep. of Germany ....... 4022356
May 23, 1991 [DE] Fed. Rep. of Germany ....... 4116838

[51] Int. Cl.$^5$ ............................................. G11B 5/008
[52] U.S. Cl. ................................................... 360/96.6
[58] Field of Search ...................... 360/96.5, 93, 96.6, 360/96.1, 137

[56] References Cited

U.S. PATENT DOCUMENTS

| | | | |
|---|---|---|---|
| 3,872,509 | 3/1975 | Yoshii | 360/137 |
| 3,896,492 | 7/1975 | Socias | 360/93 |
| 3,947,884 | 3/1976 | Yokota et al. | 360/96.6 |
| 4,345,283 | 8/1982 | Maryschka | 360/96.6 |
| 4,476,506 | 10/1984 | Prelletz et al. | 360/96.6 |
| 4,712,145 | 12/1987 | Narvki et al. | 360/93 |
| 4,722,012 | 1/1988 | Toldi et al. | 360/97 |
| 4,802,037 | 1/1989 | Tanaka et al. | 360/96.5 |

FOREIGN PATENT DOCUMENTS 2162937  6/1973  Fed. Rep. of Germany ..... 360/96.6

*Primary Examiner*—John H. Wolff
*Assistant Examiner*—David D. Davis
*Attorney, Agent, or Firm*—Brian J. Wieghaus

[57] ABSTRACT

A magnetic-tape-cassette apparatus includes a loading mechanism with a cassette holder (321, 348) which is adapted to lift the magnetic-tape cassette (200) into an ejection position, in which the cassette (200) is inserted and ejected, and to lower the magnetic-tape cassette (200) onto a cassette support (331) in a play position, in which the reel hubs (200e) are engaged by winding spindles (330). The cassette holder (321,348) has a cross-sectionally U-shaped part (321, 348) with two facing holder plates (323, 324, 348a, 348b) and a transverse holder wall (328, 348c) interconnecting the holder plates, the cassette holder (321, 348) being pivotable about a spindle (325) in such a manner that in the ejection position one holder plate (323, 348a) and in the play position the other holder plate (324, 348b) extend substantially parallel to the cassette support (231). In the area of the transverse holder wall (322, 348c) there is provided a supporting ridge (327, 349a, 354), on which the cassette (200) is supported in the ejection position and is movable while being supported, to lower the cassette (200) into the play position the supporting ridge (327, 348a, 354) is movable away from the cassette (200) to allow the rear wall (200c) of the cassette to be lowered.

29 Claims, 3 Drawing Sheets

MAGNETIC-TAPE-CASSETTE APPARATUS

BACKGROUND OF THE INVENTION

1. Field of the Invention

The invention relates to a magnetic-tape-cassette apparatus comprising reel discs for winding and unwinding a magnetic tape and a loading mechanism with a cassette holder which is adapted to raise the magnetic-tape cassette into an ejection position, in which the cassette is inserted and ejected, and to lower the magnetic-tape cassette onto a cassette support in a play position, in which the reel hubs are engaged by winding spindles, the cassette holder comprising a cross-sectionally U-shaped part with two facing holder plates and a transverse holder wall interconnecting said plates, the cassette holder being pivotable about a spindle in such a manner that in the ejection position one holder plate and in the play position the other holder plate extend substantially parallel to the cassette support.

2. Description of the Prior Art

Loading mechanisms for magnetic-tape cassettes are used in all magnetic-tape-cassette apparatuses in which the magnetic-tape cassette cannot be placed directly in the play position by hand. Such a loading mechanism is described in, for example, DE-PS 37 17 587, which corresponds to U.S. Pat. No. 4,945,431. The cassette holder is a cross-sectionally U-shaped part having two flat holder plates interconnected by a transverse holder wall. The cassette holder is moved up and down by means of a lift lever which is pivotable about an axis transverse to the loading and ejection direction of the magnetic-tape cassette. A cassette driver is guided in a slot which extends in the lift lever in the loading and ejection direction and is moved in the loading and ejection direction by an actuating lever under control of an ejection rod which is movable in the inward direction.

The mechanism for lifting and lowering the cassette holder requires lateral guide means fixedly arranged on the chassis. In addition, actuating members are required by means of which the holder is lifted and lowered while guided horizontally. This requires a substantial amount of mechanical parts.

From DE-OS 26 37 141 it is known to pivot the cross-sectionally U-shaped cassette holder about an axis parallel to the longitudinal direction of the transverse holder wall. From the transverse holder wall the holder plates are inclined towards one another in such a way that in the ejection position the upper holder plate and in the play position the lower holder plate extends substantially parallel to the cassette support.

In this cassette holder the cassette is not guided adequately during loading and ejection.

SUMMARY OF THE INVENTION

It is an object of the invention to provide a loading mechanism for a magnetic-tape-cassette apparatus, which mechanism comprises a small number of parts and which can also be controlled simply in order to lift and lower the cassette.

According to the invention this object is achieved in that in the transverse holder wall there is provided a guide means on which the cassette is supported in the ejection position and on which a lateral edge of the cassette is guided during insertion or removal of the cassette from the holder in a longitudinal direction parallel to the transverse wall, to lower the cassette into the play position the guide means is movable away from the cassette to allow the rear wall of the cassette to be lowered.

This ensures that the cassette is guided effectively on the guide means when the deck is loaded and unloaded. This guide means supports the rear wall of the cassette in the swung-up position of the cassette holder. The guide means may be in the form of supporting ridge which forms a kind of rail along which the rear wall of the cassette slides during loading and ejection.

In accordance with a further feature of the invention the guide means is formed by a supporting fold provided in the transverse holder wall. The supporting ridge is then a fixed part of the cassette holder.

Another embodiment has two modifications. In a first modification the active part is a supporting limb of a retaining spring, which limb can be pivoted away. In the second modification the active part is formed by a supporting block which can be pivoted away. Thus, in this embodiment the supporting ridge is a part to be maneuvered separately.

In accordance with a further feature of the invention the cassette is controlled by spring action inside the holder in such a manner that it is pressed onto the cassette support in the play position, during lifting the cassette experiences a torque under the influence of the spring action, as a result of which it assumes a position which is not parallel to the play position, until the holder is in the ejection position.

As in this way the cassette is always subject to the pressure exerted by the spring action the advantage is obtained that the loading mechanism does not rattle.

In accordance with a further feature of the invention a resilient element is arranged on one of the holder plates, which element in the play position of the cassette urges said cassette towards the cassette support and at the beginning of the lifting operation pivots the cassette into the ejection position in the holder, and in an advantageous modification the resilient element is a blade spring arranged on the upper holder plate.

Thus, in the play position the spring acts as a pressure spring which in this position urges the cassette against the cassette support with a specific pressure in order to preclude rattling and promote a correct tape guidance. During the change from the play position to the ejection position this spring moves the cassette rear wall upward and moves the cassette against the upper holder plate.

To this end, in accordance with a further feature of the invention, the lower holder plate, to which the cassette extends parallel in the play position, when it supports the cassette provides a cassette-supporting point selected in such a manner that the force exerted on the cassette front from above by the blade spring produces a torque about the supporting point on the cassette, which torque urges the cassette towards the supporting ridge. As a result of this, the cassette is always urged against the upper holder plate when it is not in the play position.

In an advantageous modification in the play position the supporting point is not situated on the cassette. In this way the lower holder plate cannot hinder the cassette in its play position.

In a further modification of the invention the spindle of the holder is arranged in such a way that when the cassette holder is pivoted the supporting fold is moved away from the cassette and enables it to be lowered. When the cassette holder is swung down the supporting fold moves out of the lowering path of the cassette rear wall, thereby allowing the cassette rear wall to assume the play position.

In a further modification of the invention the return movement of the cassette to the supporting fold is obtained by means of a return spring which acts against the cassette front at least during the pivotal movements, the return spring being suitably secured to the chassis. This construction is simple and requires no additional parts because a guide is required anyway at the cassette front. It also ensures that the cassette is reliably moved to the supporting fold and is guided during the ejection movement.

In accordance with a further feature of the invention the retaining spring of the active part is a blade spring which has its ends attached to the cassette holder perpendicularly to the spindle of said holder and which can be moved away from the cassette by means of the ejection rod of the cassette apparatus in such a manner that the supporting limb connected to said spring can be withdrawn from the lowering path of the rear wall of the cassette. The supporting ridge can thus be withdrawn to clear the lowering path to the play position for the rear of the cassette.

In accordance with a further feature of the invention the retaining spring has an actuating arm which can be actuated by the ejection rod to deflect the retaining spring. Since the ejection rod ensures that the supporting ridge or the supporting limb is withdrawn from the lowering path of the rear of the cassette, liberation of the rear of the cassette results from a combination of the pivotal position of the cassette holder and the withdrawal movement of the supporting ridge.

In accordance with a further feature of the invention the retaining spring comprises a cassette limb which acts against the rear cassette wall when the cassette is in the play position. This results in a further improvement of the positioning of the cassette relative to the sound head.

In accordance with a further feature of the invention the retaining spring, the supporting limb, the cassette limb and the actuating arm form a one-piece part of a resilient material.

In accordance with a further feature of the invention the retaining spring, which is constructed as a blade spring, has one of its ends attached for pivotal movement, the other end being retained in a pocket of the cassette holder. Thus, the spring can deflect to a substantial extent without loosing its guidance.

In accordance with a further feature of the invention the supporting block is pivotable about an axis parallel to the spindle of the holder and is urged in the supporting direction by means of a spring in such a manner that in the ejection position underneath the magnetic-tape cassette the supporting block forms the supporting ridge, the supporting block comprising an actuating arm via which, by means of the ejection rod, it can be pivoted out of the interior of the cassette holder to clear the lowering path of the cassette. In this case the supporting ridge can also be withdrawn, the lowering path again being cleared through a combination of the pivotal position of the cassette holder and the withdrawal movement of the supporting ridge.

In accordance with a further feature of this modification the supporting block is urged against the rear wall of the cassette in the play position under the influence of the spring. In this way the supporting block, which comprises a plurality of supports over the length of the cassette holder, not only supports the cassette during the loading and ejection movements but also positions the cassette relative to the sound head in the play position.

Therefore, in accordance with a further feature of this modification the supporting block comprises nose portions which move underneath the cassette or against the rear cassette wall and a carrier for said nose portions, the nose portions, the carrier and the actuating arm being constructed as a one-piece injection-moulded plastics part. Thus, the supporting block is an easy-to-form plastics part.

In accordance with a further feature of the invention the actuating arm cooperates with an inclined actuating surface of the ejection rod which acts in the direction of movement of the ejection rod. This results in a favourable power transmission.

In accordance with a further feature of the invention the ejection rod has two oppositely inclined actuating surfaces, which surfaces together form a tooth via which the actuating arm travels in both directions of movement of the ejection rod, said tooth pivoting the supporting limb or the supporting block out of the lowering path against the action of the spring in those time intervals in which the lowering path should be cleared. The supporting block is thus only withdrawn from its working area during the movement of the holder from the ejection position into the play position and from the play position into the ejection position.

In accordance with a further feature of the invention, in which the deck comprises locating pins which are engageable in corresponding openings in the cassette, the locating pins which are engageable in the cassette openings are constructed in such a manner that during the lowering movement they pull the cassette forward into the correct play position.

BRIEF DESCRIPTION OF THE DRAWINGS

The invention will now be described in more detail with reference to the drawings. In the drawings.

DESCRIPTION OF THE PREFERRED EMBODIMENTS

Figure 1:
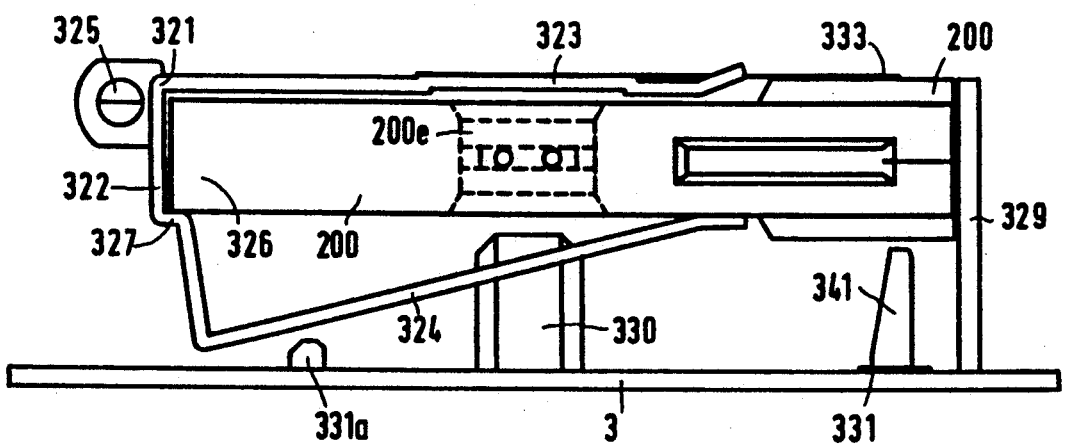
FIGS. 1 to 3 show a loading mechanism in the deck of a first embodiment of the magnetic-tape-cassette apparatus with a cassette holder in several functional positions.
Figure 2:
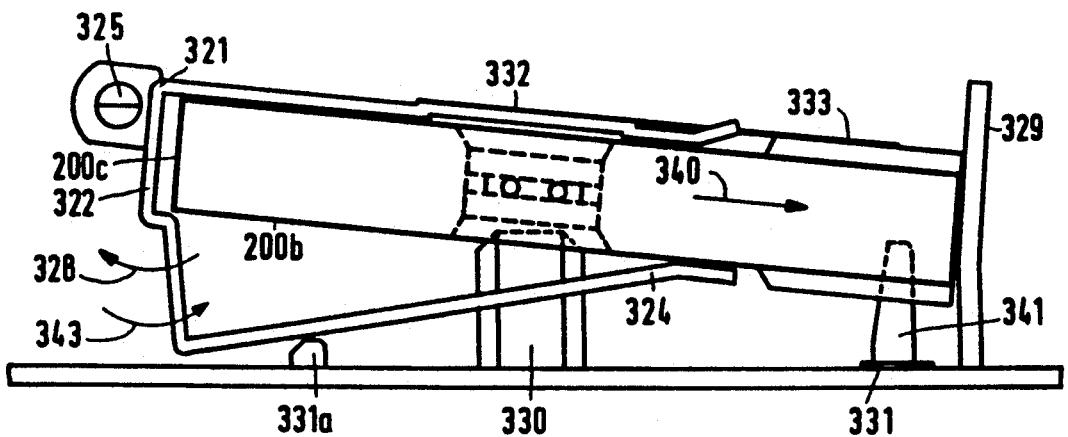
Figure 3:
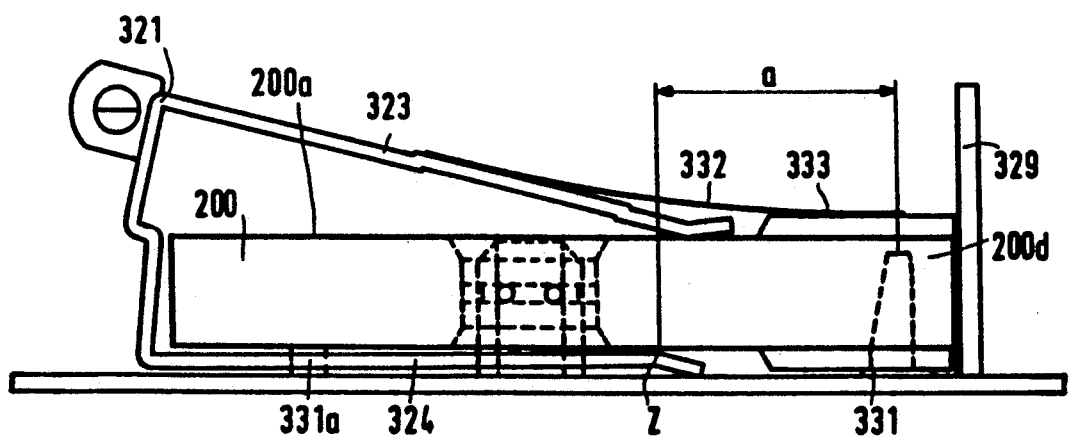

FIGS. 1 to 3 show a loading mechanism of a first embodiment of a magnetic-tape-cassette apparatus, in particular of a car-radio, comprising a cassette holder 321. This first example of the loading mechanism comprises a cassette holder 321 constructed as a U-shaped sheet-metal part having a transverse holder wall 322 and two holder plates 323 and 324. The cassette holder 321 is pivotable about a spindle 325, which extends in the longitudinal direction of the transverse holder wall 322. The holder plates 323, 324 extend at an angle smaller than 90° to one another. In the loading or ejection position the upper holder plate 323 extends substantially horizontally. This enables a magnetic tape cassette 200 to be inserted horizontally into the cassette holder 321 (FIG. 1). In this loading position the lower holder plate 324 is pivoted upwards. The magnetic-tape cassette 200 is supported on guide means in the form of a ridge 327 of the transverse holder wall 322. When the cassette holder 321 is lowered (pivoted about its spindle 325) the ridge 327 is pivoted in the direction indicated by an arrow B. The cassette is then retained by locating pins 341 and as a result of the shape of these pins it is also pulled in the direction indicated by an arrow 340 away from the ridge 327 during the downward movement of the cassette (FIG. 2).

After it has been lowered to a specific extent the cassette 200 is no longer supported on the ridge 327 as a result of this relative movement and assumes the lowered horizontal play position. The magnetic-tape cassette is then supported on cassette supports 331, 331a (FIG. 3).

The cassette holder 321 is pivoted when an ejection rod, not shown, is moved via a slotted guide, not shown.

A blade spring 332 is secured to the upper holder plate 323. The free end 333 of the blade spring 332 presses against the cassette 200 in the holder 321. In the play position illustrated in FIG. 3 the blade spring 332 is lifted relative to the position shown in FIG. 1 and 2 and thereby exerts pressure on the front 200d of the cassette 200. In this way the cassette 200 is securely held in the play position.

A return spring 329 on the chassis 3, on which the cassette supports 331, 331a are arranged, urges the cassette towards the ridge 327. When the cassette holder is swung up in the direction indicated by an arrow 343 and the cassette 200 is thus moved from the play position shown in FIG. 3 into the ejection position shown in FIG. 1 the cassette 200 is initially lifted slightly off the lower holder plate 324, causing it to be pivoted clockwise about a point z (FIG. 3) on the lower holder plate 324 under the influence of the spring 332 until the upper wall 200a of the cassette 200 abuts against the upper holder plate 323 (FIG. 2). The holder 321 is then pivoted into the position shown in FIG. 1 in the direction indicated by the arrow 343 in FIG. 2.

As soon as the rear 200c of the cassette 200 with the lower wall 200b has reached the level of the ridge 327 and the front has become disengaged from the locating pins 354 the return spring 329 urges the cassette 200 onto the ridge 327. The cassette has then again reached its ejection position (FIG. 1). The cassette 200 can then be moved out of the holder 321 by means of a mechanism, not shown.

FIGS. 4 to 8 show the loading mechanism with a cassette holder 348 in a first modification of a second embodiment. The cassette holder comprises a U-shaped sheet-metal part having an upper holder plate 348a and a lower holder plate 348b interconnected by a transverse holder wall 348c. The holder plates 348a and 348b are inclined at an angle smaller than 90° relative to one another. In the loading or ejection position shown in FIG. 4 the upper holder plate 348a extends substantially in a horizontal plane. In the play position shown in FIG. 7 the lower holder plate 348b extends in a horizontal plane. To obtain the pivotal movement the cassette holder 348 is pivotable about the spindle 325, which extends in the longitudinal direction of the transverse holder wall 348c perpendicularly to the plane of drawing. So far the cassette holders in the first and the second embodiment are of similar construction.

Figure 4:
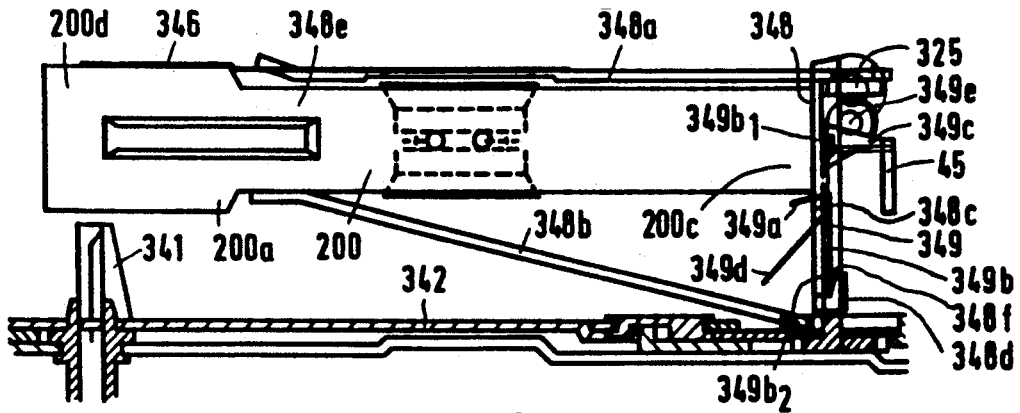
FIGS. 4 to 7 show a loading mechanism in the deck of a first modification of a second embodiment of the magnetic-tape-cassette apparatus with a cassette holder in several functional positions.

The upper holder plate 348a carries a lift spring 346, which extends from the transverse holder wall 348c towards and beyond the lateral holder opening 348e. When, as is shown in FIG. 4, a cassette 200 is inserted into the cassette holder 348 the lift spring 346 engages against the front 200c of this cassette 200. An ejection-rod spring urges an ejection rod in the outward direction.

Figure 5:
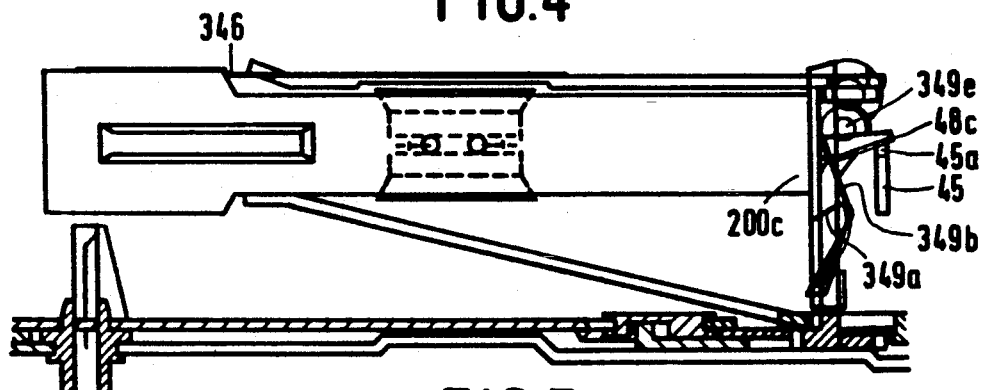
Figure 6:
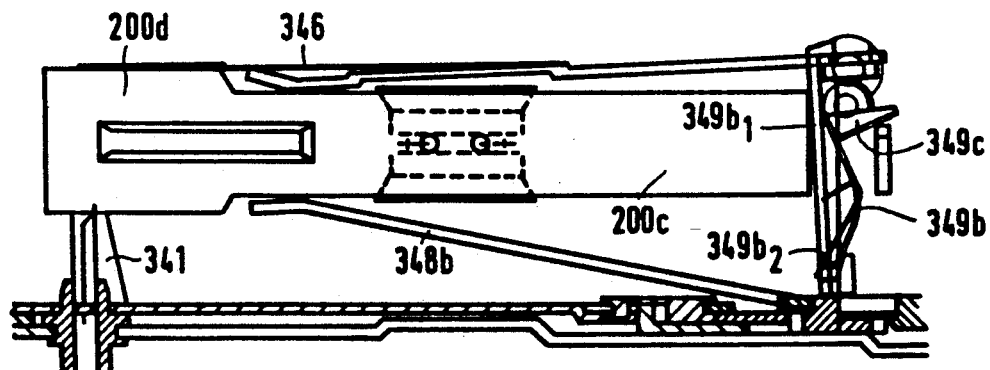
Figure 7:
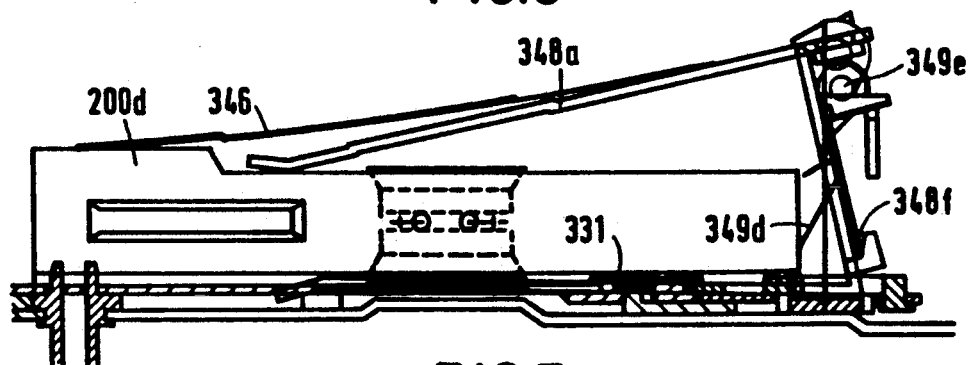

The loading mechanism and the cassette holder 348 have an associated multi-function resilient part 349. This multi-function resilient part 349 may be a flexible injection-moulded plastics part or a resilient sheet-metal part. The multi-function resilient part 349 comprises a blade spring 349b which is retained in such a manner at its ends $349b_1$ and $349b_2$ that between its ends it can deflect distinctly, as can be seen in FIGS. 5 and 6. To this end the blade-spring end $249b_1$ is arranged to be pivotable about a fulcrum 349e. The other blade-spring end $349b_2$ is retained in a pocket 348f formed by the transverse holder wall 348c and a hook 348d. The multi-function resilient part 349 is actuated by the ejection rod 45 and an ejection-rod ramp 45a formed on this rod to cooperate with an actuating arm 349c of the multi-function resilient part 349.

FIG. 4 shows the loading mechanism in the functional position in which a cassette 200 has just been inserted into the cassette holder 348. The cassette rear wall 200c is then supported by the supporting limb 349a of the multi-function resilient part 349. In this position the supporting limb 349a thus constitutes a support and guide member for the rear wall 200c of the cassette. At the head side the magnetic-tape cassette 200 lies on the holder plate 348b with its underside 200b. The blade spring 349b is urged against the transverse holder wall 348c under a clockwise bias. The clockwise bias of the blade spring 349b is obtained in that in the pocket the lower end $349b_2$ of this spring is clamped behind the hook 348d of the cassette holder 348.

FIG. 5 shows a position of the cassette holder briefly before the cassette 200 is lowered into the play position. During the ejection movement (perpendicular to the plane of drawing in FIGS. 4 to 7) the ejection rod 45 engages underneath the actuating arm 349c with its ramp 45a and thereby deflects the blade spring 349b, causing the upper blade-spring end $349b_1$ to be pivoted anti-clockwise about the fulcrum 349e. The supporting limb 349a then moves out of its supporting position out of the lowering path of the cassette 200. The cassette is pivoted slightly clockwise and the thicker portion at its front side 200d presses from below against the lift spring 346 which is now pretensioned. This situation is illustrated in FIG. 6. The rear 200c of the cassette 200 moves downward and the front 200d presses against the lift spring 346.

As the rear 200c of the cassette is further lowered the cassette holder 348 is pivoted anti-clockwise about the spindle 325. This means that the front 200d of the cassette 200 is now also lowered into the play position shown in FIG. 7, in which position the under side 200 of the cassette lies horizontally on the holder plate 348b. The blade spring 349, which is biased by the ramp 45a, is now relaxed because the cassette holder 348 is pivoted anti-clockwise. The limb 349d now acts against the cassette rear wall and urges the cassette towards the locating pins 341. The lift spring 346 acts from above against the front 200d of the cassette 200 and thereby holds it down onto the cassette support 331. This precludes rattling of the cassette when lowered in the play position. The upper holder plate 348a is situated in an inclined position before the cassette window of the apparatus. This inhibits insertion of a second cassette. The lift spring 346 and the limb 349d ensure a well-defined lowered position of the cassette 200. In the play position the cassette is supported by the cassette supports shown in FIGS. 1 to 3 and is not in contact with the holder plate 348b in the play mode.

Figure 8:
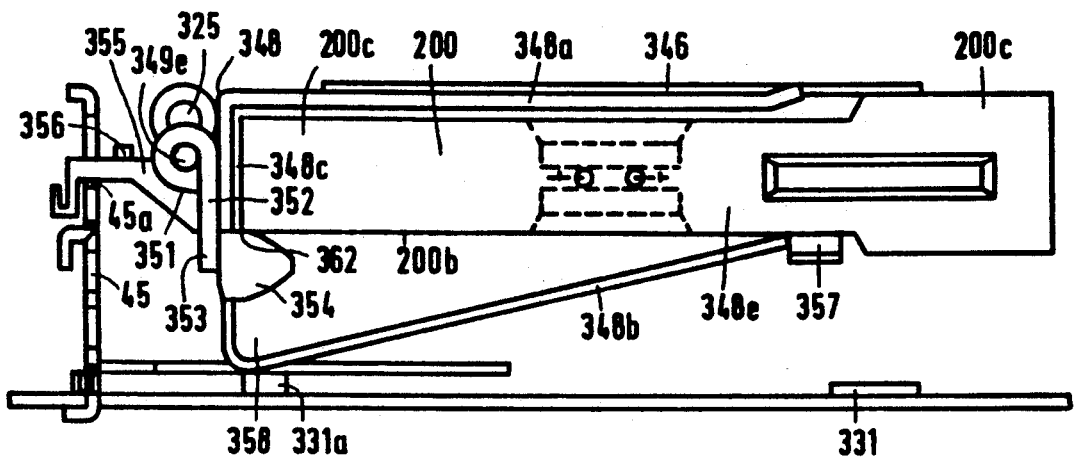
FIGS. 8 and 9 show a second modification of the second embodiment.
Figure 9:
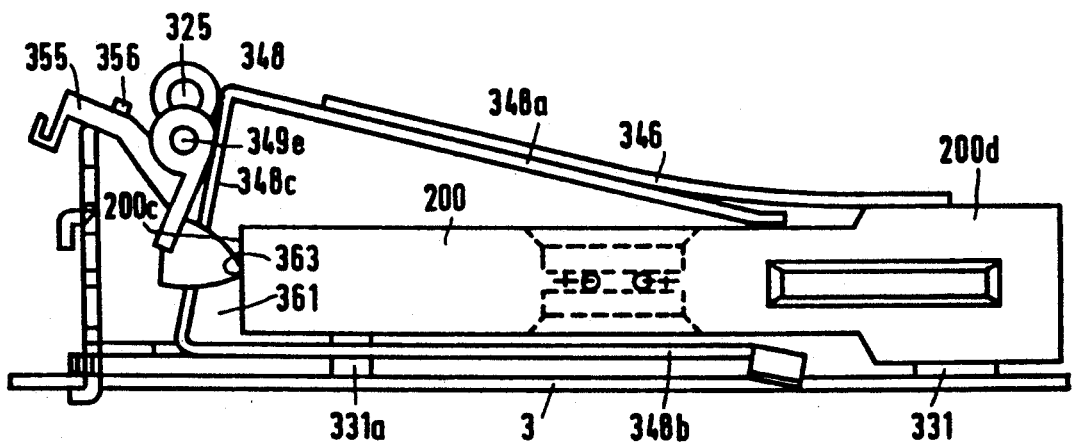

In the second modification of the second embodiment, which is shown in FIGS. 8 and 9, the cassette holder 348 also comprises a U-shaped sheet-metal part with an upper holder plate 348a and a lower holder plate 348b interconnected by a transverse holder wall 348c. The holder plates 348a and 348b are inclined at an angle <90° relative to one another. In the loading or ejection position shown in FIG. 8 the upper holder plate 348a extends substantially in a horizontal plane and the lower holder plate is upwardly inclined from the transverse holder wall 348c. In the play position shown in FIG. 9 the lower holder plate 348b extends substantially in a horizontal plane and the upper holder plate 348a is downwardly inclined from the transverse holder wall 348c. To obtain the pivotal movements the cassette holder 348 is pivotable about the spindle 325, which extends in the longitudinal direction of the transverse holder wall 348c perpendicularly to the plane of drawing.

The upper holder plate 348a carries a lift spring 346, which extends from the transverse holder wall 348c towards and beyond the lateral holder opening 348e. When a cassette 200 is inserted into the cassette holder 348 the lift spring 346 engages against the front 200d of this cassette 200.

An ejection-rod spring, not shown, urges the ejection rod 45 in the outward direction.

The loading mechanism in the second modification of the second embodiment comprises a supporting block 351. This supporting block 351 is a one-piece injected-moulded part and comprises a carrier 352 which is pivotable about a spindle 349e, which extends parallel to the spindle 325. The carrier 352 extends at right angles to the plane of drawing over the entire length of the cassette holder 348 and has nose portions 354 at its free end 353. These nose portions 354 are uniformly spaced over the length of the carrier. The supporting block 351 also comprises an actuating arm 355, which is urged in an anti-clockwise direction by a spring 356. For simplicity the spring 356 is a blade spring.

In the position shown in FIG. 8 the cassette holder 348 is in the loading or ejection position. The upper holder plate 348a extends in a horizontal plane. The nose portions 354 support the underside 200b of the cassette 200 at the rear 200c. The nose portions 354 thus form a guide member which together with the free end 357 of the lower holder plate 348b defines a double guide path for the magnetic-tape cassette 200 when it moved in or out perpendicularly to the plane of drawing.

Figure 10:
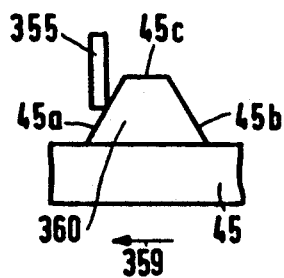
FIG. 10 illustrates the cooperation of the ejection rod of the deck with a supporting block which can be pivoted away.

During the ejection movement the ejection rod 45 is moved perpendicularly to the plane of drawing in a direction out of this plane in that the ejection rod 45 is moved inward, for example by hand. The ramp 45a of the ejection rod 45 then engages underneath the actuating arm 355 and pivots this arm upward in the clockwise direction against the action of the spring 356. The nose portions 354 are then also pivoted clockwise out of the lowering path 358 of the magnetic-tape cassette 200. As has been described for the other embodiments the magnetic-tape cassette 200 is then lowered with its back onto the lower holder plate 358b and at the same time the cassette holder 348 is pivoted clockwise. The movement of the supporting block 351 is illustrated by means of FIG. 10. The ejection rod 45 is moved in the direction indicated by an arrow 359 and the ramp 45a lifts the actuating arm 355. The inclined surface 455a forms the front of a tooth 360 having an inclined rear surface 45b. When the ejection rod 45 is moved in the direction indicated by the arrow 359 the actuating arm 355 will run onto the top 45c of the tooth 360, the nose portions 354 being withdrawn from the lowering path 358. As the movement proceeds the actuating arm 355 moves down the inclined surface 45b and the nose portion 354 is pivoted back into the interior 361 of the holder 348.

As is shown in FIG. 9 the magnetic-tape cassette 200, in the same way as in all the other embodiments, has been lowered onto the lower holder plate 348b or the cassette supports 331, 331a. The nose portion 354, which in the loading and ejection position supports the underside 200b of the magnetic-tape cassette 200 with a supporting surface 362, now abuts against the back 200c of the magnetic-tape cassette with a pressure surface 363 under the influence of the spring 355. This pressure in conjunction with pressure exerted on its front 200d by the lift spring 346 accurately positions the magnetic-tape cassette relative to the magnetic head, not shown.

The movements of the cassette holder 348 and the cassette 200 in this second modification of the second embodiment correspond to those in the first modification and, in principle, also to those in the first embodiment. For this reason FIGS. 8 and 9 only show the two end positions, i.e. the loading and eject position and the play position.

We claim:

1. A magnetic tape cassette apparatus having a cassette support, winding spindles for driving reel hubs of the cassette, and a loading mechanism including a cassette holder for moving a magnetic tape cassette between a play position, in which the cassette contacts said cassette support and the winding spindles engage the cassette reel rubs, and an ejection position in which the cassette is insertable into and removable from the cassette holder, the cassette holder comprising a cross-sectionally U-shaped part with first and second holder plates and a transverse holder wall interconnecting said holder plates and extending in a longitudinal direction of said holder plates, the loading mechanism further including a spindle about which the cassette holder is pivotable, the cassette holder being pivotable about said spindle such that in the ejection position the first holder plate extends substantially parallel to the cassette support and the second holder plate does not and in the play position the second holder plate extends substantially parallel to the cassette support and the first holder plate does not, characterized in that:

the transverse holder wall includes guide means for guiding a lateral edge of the cassette during insertion of the cassette into and removal of the cassette from said holder in the longitudinal direction parallel to the transverse wall in the ejection position, the lateral edge of the inserted cassette resting on the guide means in the ejection position, and the guide means is movable away from the cassette to allow the cassette to be moved off the guide means onto the cassette support during pivoting of the holder from the ejection position into the play position.

2. A magnetic-tape-cassette apparatus as claimed in claim 1, characterized in that the guide means consists of a supporting fold in the transverse holder wall.

3. A magnetic-tape-cassette apparatus as claimed in claim 2, characterized in that the spindle of the holder is arranged in such a way that when the cassette holder is pivoted from the ejection position toward the play position the fold in the transverse wall is moved away from the cassette and enables the cassette to be moved onto the cassette support.

4. A magnetic tape cassette apparatus according to claim 2, further comprising: a return spring which acts on the cassette during movement of said holder from said play position to said ejection position to urge the lateral edge of the cassette onto the fold in the transverse wall.

5. A magnetic-tape-cassette apparatus as claimed in claim 1, characterized in that the guide means comprises an active part which is moveable away from the cassette.

6. A magnetic-tape-cassette apparatus as claimed in claim 5, characterized in that the active part comprises a retaining spring having a supporting limb for supporting the cassette, which supporting limb is pivotable away from the cassette.

7. A magnetic-tape-cassette apparatus as claimed in claim 6, further comprising an ejection rod and wherein the retaining spring is a blade spring having ends attached to the cassette holder perpendicularly to the spindle of said holder, said blade spring being moveable away from the cassette by the ejection rod in such a manner that the supporting limb connected to said blade spring is withdrawn from the lowering path of the cassette during movement of the cassette holder towards the play position.

8. A magnetic-tape-cassette apparatus as claimed in claim 7, characterized in that the blade spring has an actuating arm which is actuatable by the ejection rod to deflect the blade spring.

9. A magnetic-tape-cassette apparatus as claimed in claim 8, characterized in that the retaining spring comprises a cassette limb for acting against the rear cassette wall when the cassette is in the play position.

10. A magnetic-tape-cassette apparatus as claimed in claim 9, characterized in that the retaining spring, the supporting limb, the cassette limb and the actuating arm form a one-piece part of a resilient material.

11. A magnetic-tape-cassette apparatus as claimed in claim 10, characterized in that the cassette holder includes a pocket and the blade spring has one end attached for pivotal movement about an axis parallel to the spindle of the holder and another end retained in said pocket of the cassette holder.

12. A magnetic-tape-cassette apparatus as claimed in claim 10, characterized in that the ejection rod has two oppositely inclined actuating surfaces, which surfaces together form a tooth which engages the actuating arm of the supporting block so that it travels in both directions of movement of the ejection rod, said tooth pivoting the supporting limb out of the lowering path against the action of the blade spring during movement of the cassette holder from the ejection to the play position.

13. A magnetic-tape-cassette apparatus as claimed in claim 7, characterized in that the ejection rod has two oppositely inclined actuating surfaces, which surfaces together form a tooth which engages the actuating arm of the supporting block so that it travels in both directions of movement of the ejection rod, said tooth pivoting the supporting limb out of the lowering path of the cassette against the action of the blade spring during movement of the cassette holder from the ejection to the play position.

14. A magnetic-tape-cassette apparatus as claimed in claim 5, characterized in that the active part comprises a supporting block which is pivotable away from the cassette.

15. A magnetic-tape-cassette apparatus as claimed in claim 14, further comprises an ejection rod and wherein the supporting block is pivotable about an axis parallel to the spindle of the holder, a spring urges the supporting block against the cassette in the ejection position, and the supporting block comprises an actuating arm actuatable by the ejection rod to pivot the supporting block out of the interior of the cassette holder to clear the lowering path of the cassette during movement of the cassette holder from the ejection to the play position.

16. A magnetic-tape-cassette apparatus as claimed in claim 14, further comprising a spring for urging the supporting block against the cassette in the play position.

17. A magnetic-tape-cassette apparatus as claimed in claims 14, 16 or 15, characterized in that the supporting block comprises nose portions for engaging the cassette and a carrier for said nose portions, the nose portions, the carrier and the actuating arm being constructed as a one-piece plastics part.

18. A magnetic-tape-cassette apparatus as claimed in claim 17, characterized in that the ejection rod includes an inclined actuating surface which acts in the direction of movement of the ejection rod and cooperates with the actuating arm for pivoting the supporting block.

19. A magnetic-tape-cassette apparatus as claimed in claim 18, characterized in that the ejection rod has two oppositely inclined actuating surfaces, which surfaces together form a tooth via which the actuating arm of the supporting block travels in both directions of movement of the ejection rod, said tooth pivoting the supporting block out of the lowering path of the cassette against the action of the spring during movement of the cassette holder from the ejection to the play position.

20. A magnetic tape cassette apparatus according to claim 14, further comprises an ejection rod and wherein said supporting block has a portion actuatable by said ejection rod to pivot said supporting block for lowering the cassette into the play position during pivoting of the cassette holder from the ejection to the play position.

21. A magnetic-tape-cassette apparatus as claimed in claim 1, characterized in that a resilient element is arranged on one of the holder plates, for urging the cassette towards the cassette support in the play position of the holder and for pivoting the cassette such that the edge portion of the cassette facing the transverse wall contacts the first holder plate at the beginning of pivoting of the holder from the play position into the ejection position.

22. A magnetic-tape-cassette apparatus as claimed in claim 21, characterized in that the second holder plate, to which the cassette extends parallel in the play position, includes a cassette-supporting point selected such that the force exerted on the cassette by the resilient element produces a torque about the supporting point on the cassette, which torque urges the said lateral edge of the cassette towards the first holder plate.

23. A magnetic-tape-cassette apparatus as claimed in claim 22, characterized in that in the play position the supporting point does not engage the cassette.

24. A magnetic-tape-cassette apparatus as claimed in claim 23, characterized in that the spindle of the holder is arranged in such a way that when the cassette holder is pivoted from the ejection position toward the play position the guide means is moved away from the cassette and enables the cassette to be moved onto the cassette support.

25. A magnetic tape cassette apparatus according to claim 24, further comprising: a return spring which acts on the cassette during movement of said holder from said play position to said ejection position to urge the lateral edge of the cassette onto the guide means.

26. A magnetic-tape-cassette apparatus as claimed in claim 1, further comprising locating pins which are engageable in corresponding openings of the cassette characterized in that the locating pins are constructed such that during movement of the holder from the ejection position into the play position the locating pins pull the cassette into a predetermined position on the cassette support.

27. A magnetic tape cassette apparatus according to claim 1, further comprising biasing means for biasing the cassette onto the cassette support in the play position of the holder, said biasing means being arranged such that during movement of the holder from the play position into the ejection position the biasing means exerts a torque on the cassette to move it into a position which is not parallel with the cassette support until the holder is in the ejection position.

28. A magnetic-tape-cassette apparatus as claimed in claim 1, characterized in that the spindle of the holder is arranged in such a way that when the cassette holder is pivoted from the ejection position toward the play position the guide means is moved away from the cassette and enables the cassette to be moved onto the cassette support.

29. A magnetic tape cassette apparatus according to claim 1, further comprising: a return spring which acts on the cassette during movement of said holder from said play position to said ejection position to urge the lateral edge of the cassette onto the guide means.

* * * * *